R. W. DULL.
CONVEYER BUCKET.
APPLICATION FILED OCT. 22, 1910.
1,026,385.
Patented May 14, 1912.
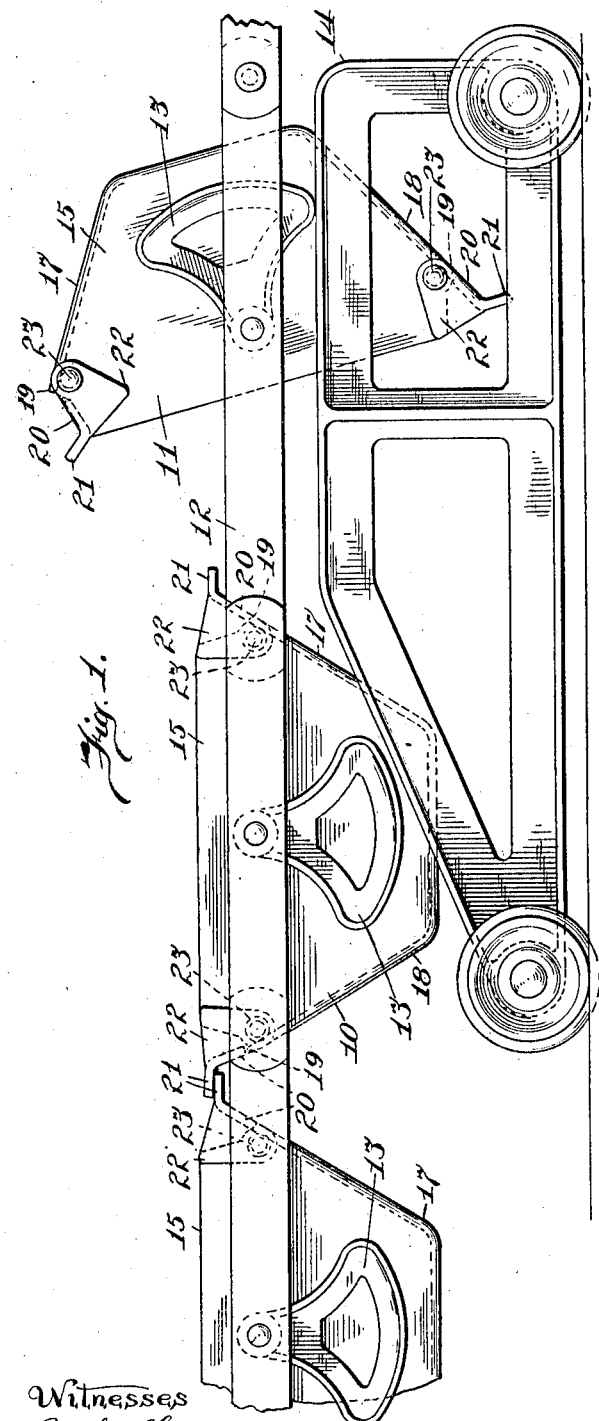
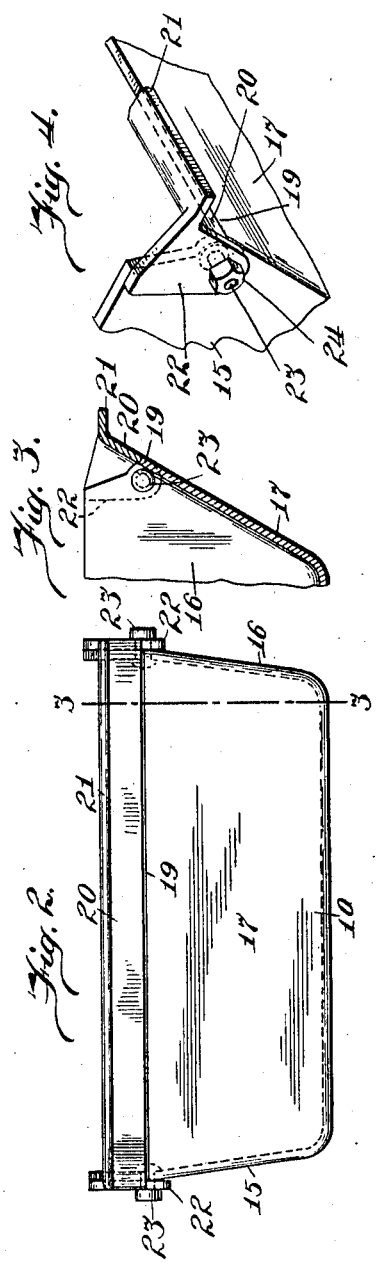
Witnesses
Milton Lenoir
E. M. Klatcher
Inventor
Raymond W. Dull.
By Gibson & Gibson
Attorneys.

UNITED STATES PATENT OFFICE.

RAYMOND W. DULL, OF AURORA, ILLINOIS, ASSIGNOR TO STEPHENS-ADAMSON MANUFACTURING COMPANY, A CORPORATION OF ILLINOIS.

CONVEYER-BUCKET.

1,026,385.  Specification of Letters Patent.  Patented May 14, 1912.

Application filed October 22, 1910. Serial No. 588,478.

*To all whom it may concern:*

Be it known that I, RAYMOND W. DULL, a citizen of the United States, and resident of Aurora, county of Kane, and State of Illinois, have invented certain new and useful Improvements in Conveyer-Buckets, of which the following is a specification, and which are illustrated in the accompanying drawings, forming a part thereof.

The invention relates to buckets ordinarily used in connection with endless conveyers, in which a series of buckets are mounted upon sprocket chains traveling over suitable gears.

The object of the invention is to provide improved means for preventing the escape of material between adjacent buckets in filling; and it consists in a structure as hereinafter described and which is illustrated in the accompanying drawings, in which—

Figure 1 is a detail of a conveyer showing a side view of some of the buckets; Fig. 2 is an end view of one of the buckets; Fig. 3 is a detail section on the line 3—3 of Fig. 2; and Fig. 4 is a detail in perspective showing one corner of a bucket.

The buckets, as 10, 11, are pivotally mounted upon sprocket chains, one of which is shown at 12, and are provided with trip lugs 13 for engaging the trip 14, here shown as being movable and as being of a type commonly in use. In conveyers of this character the buckets are usually passed under a hopper or chute from which the material to be conveyed is discharged into them. It is essential, in order to avoid the escape of material between the buckets as they are filled, to have them in some way overlap one another, but difficulty has been experienced in working out this detail in such manner that the bucket may be free to turn on its pivot. In the present instance the bucket comprises end portions 15, 16, and sloping sides 17, 18. The upper edges of the sides, as represented at 19, are lower than the upper edges of the ends but are extended upwardly by means of a pivoted plate 20 having an outstanding lip 21. The plate 20 is provided at each end with ears 22, which overlap the ends of the bucket and through which pass hinge pins 23 rigidly set within the bucket wall. These pins may be in the form of rivets or, as shown in Fig. 4, studs projecting outwardly from the end of the bucket and carrying nuts, as 24. The plates 20 may swing inwardly, the upper corners of the sides of the bucket being cut away, as shown at 25, to permit such movement. The inward movement is limited by contact of the plate with the side wall of the bucket, as will be plainly seen in Fig. 4. The outward movement of the plate 20 is limited by its contact with the upper edge of the end of the bucket, as more plainly seen in Fig. 3, and when thus stopped the plate is in alinement with the end wall. The lips 21 are of such width that the lips of adjacent buckets overlap when the buckets are in horizontal position, as shown at the left of Fig. 1. When a bucket is turned by the trip 14, its lips 21 swing away from the lips of adjacent buckets, providing the descending lip is below and the ascending lip is above its neighbor. If it happens that such lips are respectively above and below the lips of adjacent buckets with which they coöperate, the plates 20 will swing inwardly in order to permit them to pass the lips with which they are engaged. The plates 20 and their lips 21 are of sufficient weight to cause them to assume their position of use by the action of gravity.

An added advantage in the construction described is found in the fact that these lips, constituting, as they do, the discharge spouts of the bucket, and consequently suffering greater wear than other portions of the bucket, may be readily removed for repair or replacement.

I claim as my invention—

In a conveyer bucket, in combination, a tilting body having upright end walls and a sloping side wall of less height than the said end walls, trunnions mounted in alinement on the said end walls of the body adjacent the upper edge of the said sloping side wall, and an oscillatable plate of substantially L-shape in cross section mounted to swing on the said trunnions, one arm of the plate normally occupying the plane of the said sloping side wall to form a continuation of the same extending it to substantially the same height as the said end walls of the body and the other arm of the plate constituting an outstanding discharge lip.

RAYMOND W. DULL.

Witnesses:
 Jos. P. AHLERS,
 J. J. FASMER.

Copies of this patent may be obtained for five cents each, by addressing the "Commissioner of Patents Washington, D. C."